United States Patent
Ohsaka

(10) Patent No.: US 9,613,725 B2
(45) Date of Patent: Apr. 4, 2017

(54) NEUTRON DETECTION APPARATUS

(71) Applicant: Kenji Ohsaka, Osaka (JP)

(72) Inventor: Kenji Ohsaka, Osaka (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 660 days.

(21) Appl. No.: 13/783,430

(22) Filed: Mar. 4, 2013

(65) Prior Publication Data

US 2014/0105346 A1    Apr. 17, 2014

(30) Foreign Application Priority Data

Oct. 12, 2012    (JP) .................................. 2012-226729

(51) Int. Cl.
G21C 17/00 (2006.01)
G21C 17/108 (2006.01)

(52) U.S. Cl.
CPC .................. *G21C 17/108* (2013.01)

(58) Field of Classification Search
CPC ........ G21C 17/00; G21C 17/02; G21C 17/10; G21C 17/104; G21C 17/108
See application file for complete search history.

(56) References Cited

U.S. PATENT DOCUMENTS

| | | | |
|---|---|---|---|
| 3,930,936 A * | 1/1976 | Aleite .................. | G21C 17/108 376/254 |
| 4,414,671 A * | 11/1983 | Wells, Jr. .................. | H01S 3/09 372/55 |
| 2009/0174397 A1 | 7/2009 | Leclerc | |

FOREIGN PATENT DOCUMENTS

| | | |
|---|---|---|
| CN | 101421798 A | 4/2009 |
| JP | 55-4527 A | 1/1980 |
| JP | 55-6250 A | 1/1980 |
| JP | 59-003236 A | 1/1984 |
| JP | 59-220682 | 12/1984 |
| JP | 11-109036 A | 4/1999 |

(Continued)

OTHER PUBLICATIONS

Minutes of the technical special sub-committee of the environmental safety management committee of the Ikata Nuclear Power Plant, with English Abstract, pp. 1-6, http://www.ensc.jp/pc/user/HOUDOU/%E7%AE%A1%E7%90%86%E5%A7%94% . . . , Feb. 4, 2013.

(Continued)

*Primary Examiner* — Marshall O'Connor
(74) *Attorney, Agent, or Firm* — Buchanan Ingersoll & Rooney PC

(57) ABSTRACT

A neutron detector detects a neutron flux distribution of the inside of a reactor. The neutron detector includes a thimble guide tube that is inserted inside of the reactor, for inserting the neutron detector. A drive apparatus is connected to the thimble guide tube for inserting or extracting the neutron detector into or out of the thimble guide tube. A vacuum unit controls the vacuum state in the thimble guide tube. A supply unit supplies carbon dioxide gas. A gas purge unit is connected to the supply unit and conducts gas purge in the thimble guide tube. A gate valve is provided between the thimble guide tube and the drive apparatus, and performs an open/close operation. A control apparatus controls the gate valve, the drive apparatus, the vacuum unit, the supply unit, and the gas purge unit.

8 Claims, 4 Drawing Sheets

(56) References Cited

FOREIGN PATENT DOCUMENTS

JP        2001-099982 A      4/2001

OTHER PUBLICATIONS

First Notice of Reasons for Rejection dated Sep. 22, 2015 issued in the corresponding Chinese Patent Application No. 201310193657.X and English translation (9 pages).
Notice of Reasons for Rejection dated Dec. 1, 2015 issued in the corresponding Japanese Patent Application No. 2012-226729 and English translation (7 pages).

* cited by examiner

ENLARGEMENT OF X

NEUTRON DETECTION APPARATUS

BACKGROUND OF THE INVENTION

1. Field of the Invention

The present invention relates to a neutron detection apparatus capable of preventing occurrence of solid material in a thimble guide tube.

2. Description of the Background Art

In a BWR (Boiling Water Reactor), an in-reactor neutron monitor (hereinafter, referred to as an in-core monitor) is provided for recognizing the neutron flux distribution state in the reactor during operation of the reactor. The in-core monitor is inserted into the reactor core through an in-core monitor housing (hereinafter, referred to as an in-core housing) and a guide tube provided above the in-core housing.

A washing apparatus for the in-core housing and the guide tube includes: an outer box connected to the in-core monitor contained in the in-core housing and the guide tube provided above the in-core housing, and to an in-core flange forming a sheet portion; a piston shaft contained in the outer box so as to be movable up and down, and having a hollow portion through which washing drainage water flows down, on the inner circumferential side; a drive mechanism connected to the outer box and driving the piston shaft; and a discharge mechanism connected to the outer box and discharging the washing drainage water (for example, see Patent Document 1).

Patent Document 1: Japanese Laid-Open Patent Publication No. 59-220682

Such a conventional washing apparatus uses water for washing, and there is a problem that it is difficult to carry out the washing with water in a PWR (Pressurized Water Reactor).

SUMMARY OF THE INVENTION

The present invention has been made to solve the above problem, and an object of the present invention is to provide a neutron detection apparatus capable of preventing occurrence of solid material in a thimble guide tube of a pressurized water reactor.

A neutron detection apparatus according to the present invention is a neutron detection apparatus which detects a neutron flux distribution of the inside of a pressurized water reactor, the neutron detection apparatus including: a neutron detector which detects the neutron flux distribution of the inside of the reactor; a thimble guide tube which is provided being inserted from the outside of the reactor into the inside of the reactor, for inserting the neutron detector into the inside of the reactor; a drive apparatus which is connected to the thimble guide tube and which inserts the neutron detector into the thimble guide tube or extracts the neutron detector out of the thimble guide tube; a vacuum unit which controls the vacuum state in the thimble guide tube; a supply unit which supplies carbon dioxide gas; a gas purge unit which is connected to the supply unit and conducts gas purge in the thimble guide tube by carbon dioxide gas; a gate valve which is provided between the thimble guide tube and the drive apparatus and performs open/close operation between the thimble guide tube and the drive apparatus; and a control apparatus which controls the gate valve, the drive apparatus, the vacuum unit, the supply unit, and the gas purge unit.

The neutron detection apparatus of the present invention, owing to its configuration as described above, can prevent occurrence of solid material in the thimble guide tube.

The foregoing and other objects, features, aspects and advantages of the present invention will become more apparent from the following detailed description when read in conjunction with the accompanying drawings.

DETAILED DESCRIPTION OF THE PREFERRED

Embodiments of the Invention

First Embodiment

Figure 1:
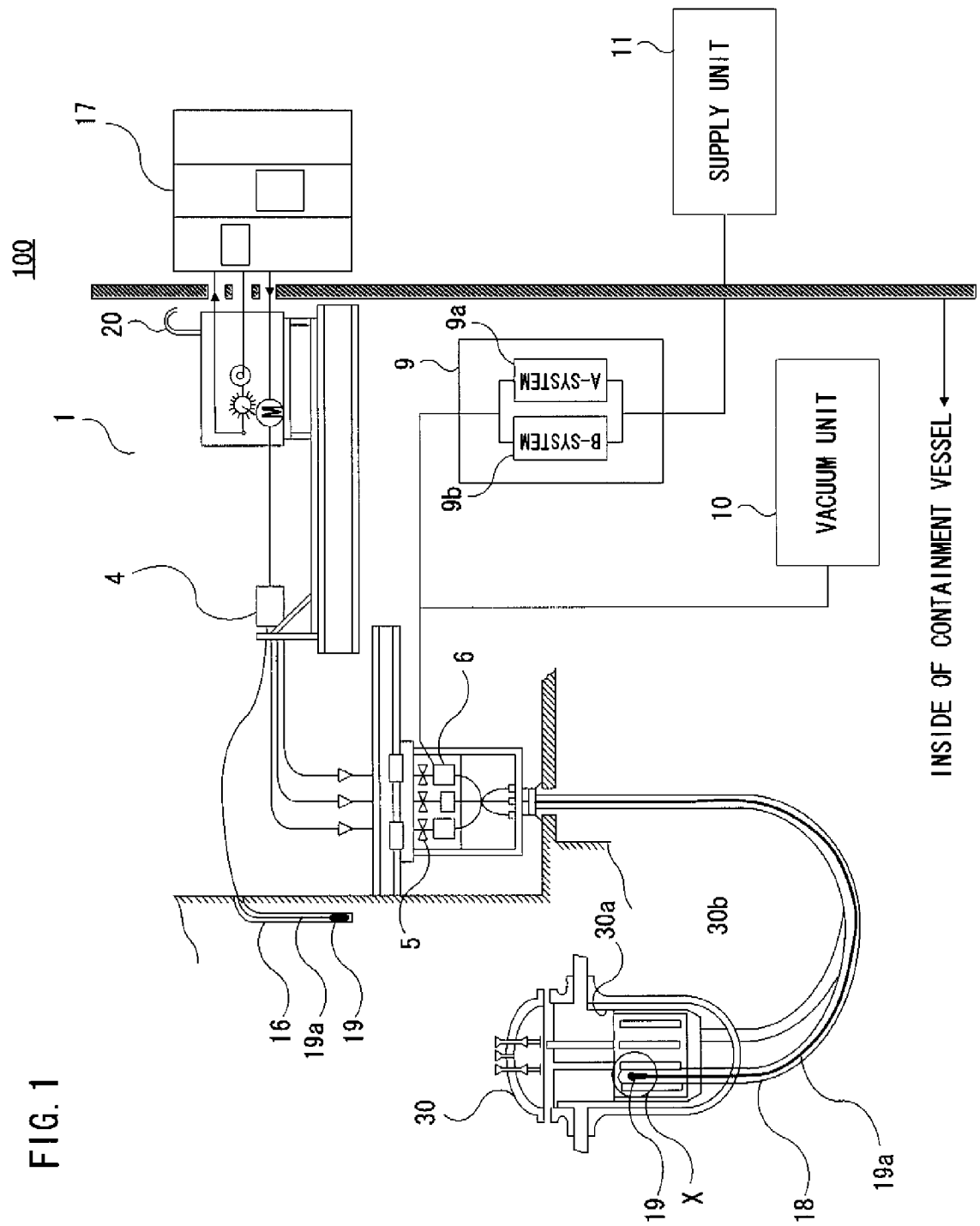
FIG. 1 is a diagram showing the configuration of a neutron detection apparatus of the first embodiment of the present invention.
Figure 2:
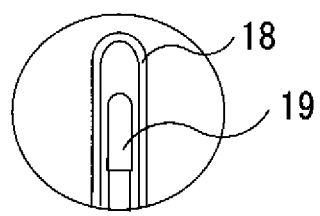
FIG. 2 is an enlarged view showing the details of a detector of the neutron detection apparatus shown in FIG. 1.

Hereinafter, embodiments of the present invention will be described. FIG. 1 is a diagram showing the configuration of a neutron detection apparatus according to the first embodiment of the present invention. FIG. 2 is an enlarged view showing the details of a part X of the neutron detection apparatus shown in FIG. 1. In the drawings, a neutron detection apparatus 100 detects a neutron flux distribution of a reactor inside 30a of a pressurized water reactor 30. The neutron detection apparatus 100 includes a neutron detector 19, a thimble guide tube 18, a drive apparatus 1, a vacuum unit 10, a supply unit 11, a gas purge unit 9, a gate valve 5, and a control apparatus 17.

The neutron detector 19 detects the neutron flux distribution of the reactor inside 30a of the reactor 30. The thimble guide tube 18 is provided being inserted into the reactor inside 30a of the reactor 30 from a reactor outside 30b of the reactor 30, for inserting the neutron detector 19 into the reactor inside 30a of the reactor 30. Therefore, the neutron detector 19 has a cable 19a, for moving in the thimble guide tube 18.

The drive apparatus 1 is connected to the thimble guide tube 18. The drive apparatus 1 inserts the neutron detector 19 into the thimble guide tube 18, or extracts the neutron detector 19 out of the thimble guide tube 18. Therefore, the drive apparatus 1 has a pipe, a motor, and the like which are connected to the thimble guide tube 18. The drive apparatus 1 conducts the above operation by inserting or extracting the cable 19a of the neutron detector 19 in the pipe.

When the neutron detector 19 is not used, the drive apparatus 1 extracts the neutron detector 19 from the thimble guide tube 18. Then, the drive apparatus 1 inserts the neutron detector 19 into a storage pipe 16 provided on the reactor outside 30b of the reactor 30. In addition, the drive apparatus 1 has an exhaust pipe 20 for discharging carbon dioxide gas through a ceiling. The exhaust pipe 20 is formed by a U-shaped pipe so as to prevent entry of trash such as dust. The outlet of the exhaust pipe 20 is directed downward.

The entire drive apparatus 1 is configured to be in a sealed state except for the exhaust pipe 20. Therefore, an orifice is provided inside the drive apparatus 1 so that the inside of the drive apparatus 1 is adjusted to have a slightly higher pressure than the atmospheric pressure. The vacuum unit 10 controls the vacuum state in the thimble guide tube 18. Specifically, the vacuum unit 10 has a vacuum pump, a vacuum gauge, a valve, and the like.

The supply unit 11 supplies carbon dioxide gas. Specifically, the supply unit 11 has a carbon dioxide gas bottle, a pressure gauge, a pressure adjustment valve, a flow meter, and the like. The gas purge unit 9 is connected to the supply unit 11 and conducts gas purge in the thimble guide tube 18 by carbon dioxide gas. Specifically, the gas purge unit 9 has two systems of an A-system 9a and a B-system 9b. The A-system 9a is capable of supplying a small flow of carbon dioxide gas to the thimble guide tube 18. The B-system 9b is capable of supplying a larger flow of carbon dioxide gas to the thimble guide tube 18 than the A-system 9a.

The gate valve 5 is provided between the thimble guide tube 18 and the drive apparatus 1, and conducts open/close operation between the thimble guide tube 18 and the drive apparatus 1. Specifically, the gate valve 5 shuts down or allows communication between the thimble guide tube 18 side and the drive apparatus 1 side, through the open/close operation. The position where the gate valve 5 is provided is higher than the top end position of the reactor inside 30a of the reactor 30 of the thimble guide tube 18. Since carbon dioxide gas is heavier than air, the above configuration suppresses release of carbon dioxide gas filling the inside of the thimble guide tube 18 to the outside and suppresses entry of air into the thimble guide tube 18.

The control apparatus 17 controls the gate valve 5, the drive apparatus 1, the vacuum unit 10, the supply unit 11, and the gas purge unit 9. Actually, a plurality of the neutron detectors 19 are provided, and along with these, the same number of the thimble guide tubes 18 are provided. Therefore, the drive apparatus 1 drives the neutron detector 19 while selecting one of the neutron detectors 19 by using a first passage selection apparatus 4. In addition, control in each of the vacuum unit 10 and the gas purge unit 9 is performed by selection using a second passage selection apparatus 6. The control apparatus 17 controls the first passage selection apparatus 4 and the second passage selection apparatus 6.

The case where the gas purge unit 9 and the vacuum unit 10 are provided in a containement vessel of the reactor 30 has been shown as an example, but the present invention is not limited thereto. If the containement vessel has no space for providing these units, they may be provided outside the containement vessel. In each embodiment, the operation will be described for only one pair of the neutron detector 19 and the thimble guide tube 18. It is noted that the operations of the other pairs of the neutron detectors 19 and the thimble guide tubes 18 can be performed in the same manner.

First, the assumed principle of occurrence of solid material in the thimble guide tube 18 of the neutron detection apparatus 100 will be described. If air is present in the thimble guide tube 18, solid material occurs as shown by the following expression (1).

$$NH_3 + H_2O + CO_2 \rightarrow NH_4HCO_3 \quad (1)$$

$CO_2$: Present in air.

$H_2$: Present by hydrogen in a primary coolant in the reactor 30 transmitting into the thimble guide tube 18.

$N_2$: Present in air.

$H_2O$: Present by being generated through oxidization of $H_2$.

$NH_3$: Present by reaction between $N_2$ and $H_2$ under radiation.

Therefore, through coagulation reaction among the above materials, solid material composed of ammonium hydrogen carbonate ($NH_4HCO_3$) occurs. In order not to thus cause ammonium hydrogen carbonate, the following expression (2) needs to be satisfied.

$$X(NH_3) + X(H_2O) + X(CO_2) \times P_T^3 \rightarrow e-(\Delta FO/RT) \quad (2)$$

X: Mole fraction (volume fraction) of each gas
$P_T$: Gas total pressure (ata)
T: Gas absolute temperature (K)
ΔFO: Free energy of reaction
R: Gas constant Therefore, in order to satisfy the above expression (2), specifically, there are a method of reducing the gas total pressure and a method of reducing the gas mole fraction. However, it is impossible to reduce the mole fractions of $H_2O$ and $CO_2$. Therefore, suppression of $NH_3$ is conceivable. That is, prevention of entry of air ($N_2$) is conceivable. Accordingly, the present invention devises a method of filling the inside of the thimble guide tube 18 with $CO_2$.

Next, the operation of the neutron detection apparatus of the first embodiment configured as described above will be described. First, the case where the neutron flux distribution is not measured will be described. Here, the neutron detector 19 is placed in the storage pipe 16 of the reactor outside 30b of the reactor 30.

The control apparatus 17 performs the following control. First, the gate valve 5 is closed to shut down communication between the thimble guide tube 18 side and the drive apparatus 1 side. Next, by using the vacuum unit 10, the inside of the thimble guide tube 18 is made into vacuum. Next, by using the supply unit 11 and the B-system 9b of the gas purge unit 9, the inside of the thimble guide tube 18 is filled with carbon dioxide gas. Thus, the vacuum state in the thimble guide tube 18 is replaced by carbon dioxide gas. It is noted that, actually, the step of making vacuum and the step of replacement by carbon dioxide gas are alternately repeated a plurality of times, so that the air in the thimble guide tube 18 is entirely replaced by carbon dioxide gas.

Next, the gate valve 5 is opened to allow communication between the thimble guide tube 18 side and the drive apparatus 1 side. Next, by using the supply unit 11 and the A-system 9a of the gas purge unit 9, carbon dioxide gas is made to flow constantly at about 10 to 15 cc/sec. Thus, carbon dioxide gas constantly flows toward the drive apparatus 1 side, thereby preventing entry of air into the thimble guide tube 18. In addition, since each apparatus, pipes, and the like of the drive apparatus 1 and the thimble guide tube 18 are all configured to be in a sealed state, carbon dioxide gas is discharged through the exhaust pipe 20 of the drive apparatus 1. Then, measurement of the neutron flux distribution is waited.

Next, the case where the neutron flux distribution is measured will be described. Here, the neutron detector 19 is placed in the storage pipe 16. The control apparatus 17 performs the following control. First, by using the supply unit 11 and the B-system 9b of the gas purge unit 9, carbon dioxide gas is adjusted to flow at about 7 to 10 liter/min. Then, the thimble guide tube 18 is purged by carbon dioxide gas so that the neutron detector 19 will not bring air in the drive apparatus 1 into the thimble guide tube 18. Therefore, carbon dioxide gas is discharged from the exhaust pipe 20 of the drive apparatus 1.

Next, the drive apparatus 1 extracts the neutron detector 19 from the storage pipe 16. Next, the drive apparatus 1 inserts the neutron detector 19 into the thimble guide tube 18. Next, the neutron detector 19 measures the neutron flux distribution. Next, the measurement of the neutron flux distribution is finished. Next, the drive apparatus 1 extracts the neutron detector 19 from the thimble guide tube 18. Next, the drive apparatus 1 inserts the neutron detector 19 into the storage pipe 16.

The gate valve 5 is kept opened to keep communication between the thimble guide tube 18 side and the drive apparatus 1 side. Next, by using the supply unit 11 and the A-system 9a of the gas purge unit 9, carbon dioxide gas is made to flow constantly at about 10 to 15 cc/sec. Then, the next measurement of the neutron flux distribution is waited.

According to the neutron detection apparatus of the first embodiment configured as described above, when measurement of the neutron flux distribution is stopped, carbon dioxide gas is made to flow in a small amount, i.e., at 10 to 15 cc/sec. When measurement of the neutron flux distribution is performed, carbon dioxide gas is purged at 7 to 10 liter/min. Thus, the inside of the thimble guide tube is constantly kept in a slightly pressurized state by carbon dioxide gas. As a result, $CO_2$ fills the inside of the thimble guide tube without entry of air. Therefore, occurrence of solid material of ammonium hydrogen carbonate in the thimble guide tube is prevented. Therefore, the neutron detection apparatus can be used for a long period.

Second Embodiment

Figure 3:
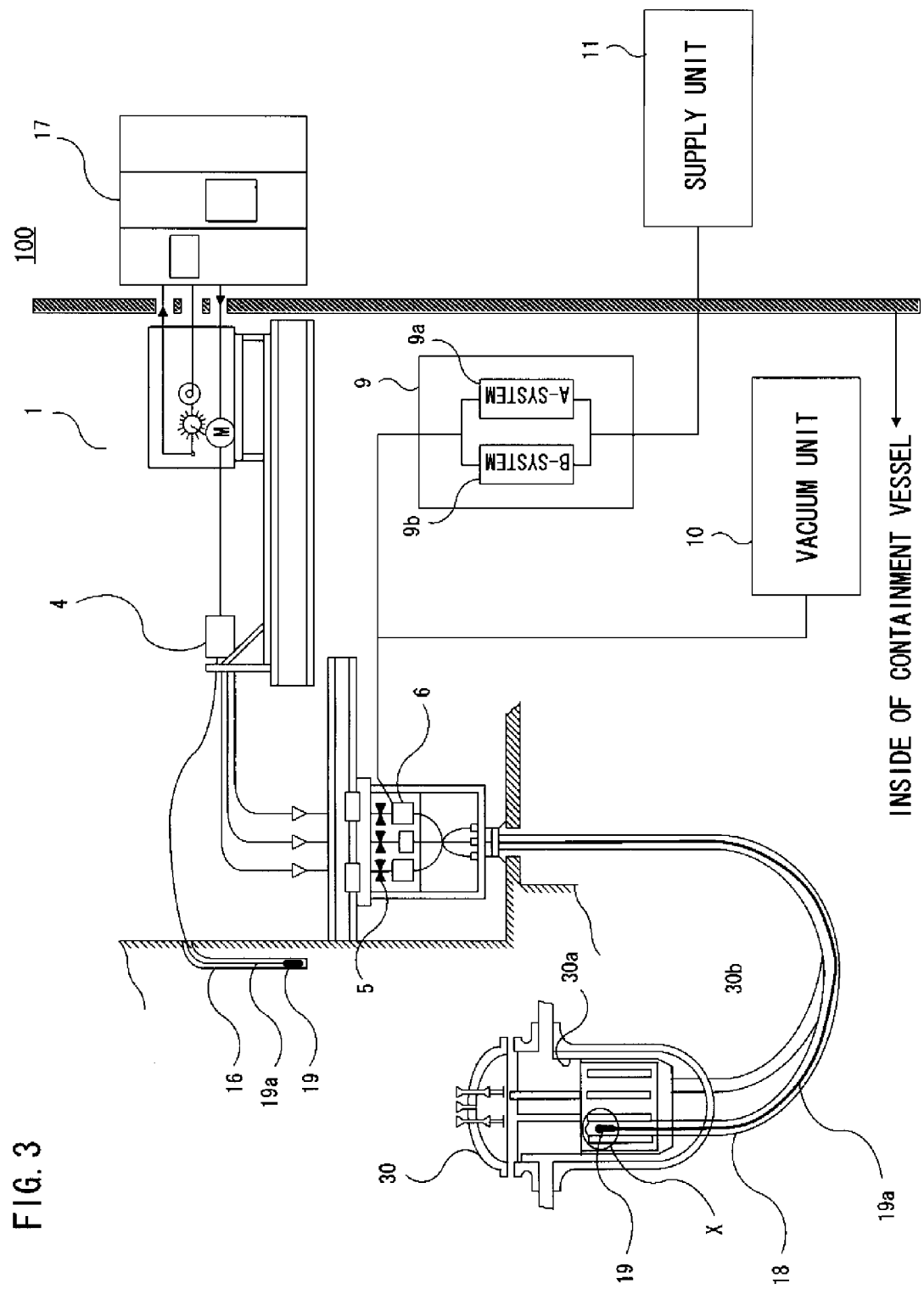
FIG. 3 is a diagram showing the configuration of a neutron detection apparatus of the second embodiment of the present invention.

FIG. 3 is a diagram showing the configuration of a neutron detection apparatus according to the second embodiment of the present invention. In the drawing, the same components as those of the first embodiment are denoted by the same reference numerals, and the description thereof is omitted. The second embodiment is different from the first embodiment in that the exhaust pipe 20 is not provided.

The operation of the neutron detection apparatus of the second embodiment configured as described above will be described. First, the case where the neutron flux distribution is not measured will be described. Here, the neutron detector 19 is placed in the storage pipe 16 of the reactor outside 30b of the reactor 30.

The control apparatus 17 performs the following control. First, the gate valve 5 is closed to shut down communication between the thimble guide tube 18 side and the drive apparatus 1 side. Next, by using the vacuum unit 10, the inside of the thimble guide tube 18 is made into vacuum. Next, by using the supply unit 11 and the B-system 9b of the gas purge unit 9, the inside of the thimble guide tube 18 is filled with carbon dioxide gas. Then, the vacuum state in the thimble guide tube 18 is replaced by carbon dioxide gas.

It is noted that, actually, the step of making vacuum and the step of replacement by carbon dioxide gas are alternately repeated a plurality of times, so that the air in the thimble guide tube 18 is entirely replaced by carbon dioxide gas. Then, the inside of the thimble guide tube 18 is kept in the pressurized state by carbon dioxide gas, and measurement of the neutron flux distribution is waited.

Next, the case where the neutron flux distribution is measured will be described. Here, the neutron detector 19 is placed in the storage pipe 16. The control apparatus 17 performs the following control. First, by using the supply unit 11 and the B-system 9b of the gas purge unit 9, carbon dioxide gas is adjusted to flow at about 7 to 10 liter/min. Then, carbon dioxide gas is purged so that the neutron detector 19 will not bring air in the drive apparatus 1 into the thimble guide tube 18.

In this purge, in the second embodiment, since the exhaust pipe 20 is not provided unlike the first embodiment, carbon dioxide gas is adjusted so as to shut out air in the drive apparatus 1 by the pressure of carbon dioxide gas so that the air will not flow into the thimble guide tube 18. Next, the gate valve 5 is opened to allow communication between the thimble guide tube 18 side and the drive apparatus 1 side.

Next, the drive apparatus 1 extracts the neutron detector 19 from the storage pipe 16. Next, the drive apparatus 1 inserts the neutron detector 19 into the thimble guide tube 18. Next, the neutron detector 19 measures the neutron flux distribution. Next, the measurement of the neutron flux distribution is finished. Next, the drive apparatus 1 extracts the neutron detector 19 from the thimble guide tube 18. Next, the drive apparatus 1 inserts the neutron detector 19 into the storage pipe 16.

Next, the gate valve 5 is closed to shut down communication between the thimble guide tube 18 side and the drive apparatus 1 side. Next, until the next measurement of the neutron flux distribution, by using the supply unit 11 and the A-system 9a of the gas purge unit 9, the inside of the thimble guide tube 18 is kept in the pressurized state by carbon dioxide gas, and thus the measurement of the neutron flux distribution is waited.

The second embodiment configured as described above, as well as providing the same effect as in the first embodiment, closes the gate valve when the neutron flux distribution is not measured. Then, the thimble guide tube side is shut down and the inside of the thimble guide tube is pressurized by carbon dioxide gas. Therefore, consumption of carbon dioxide gas can be decreased as compared to the first embodiment.

Third Embodiment

Figure 4:
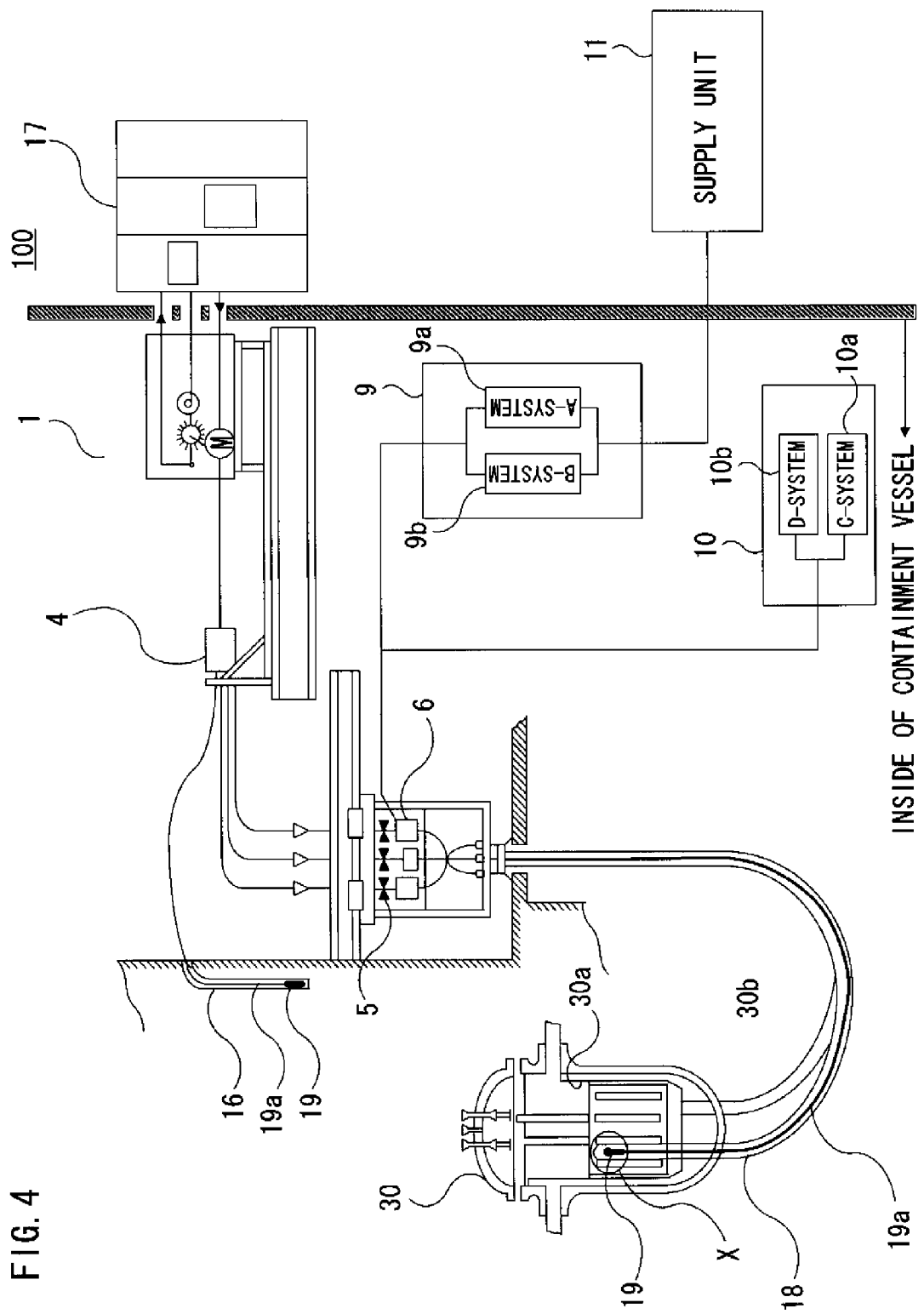
FIG. 4 is a diagram showing the configuration of a neutron detection apparatus of the third embodiment of the present invention.

FIG. 4 is a diagram showing the configuration of a neutron detection apparatus according to the third embodiment of the present invention. In the drawing, the same components as those of the previously-described embodiments are denoted by the same reference numerals, and the description thereof is omitted. The vacuum unit 10 has a C-system 10a and a D-system 10b. The C-system 10a and the D-system 10b are both capable of similarly keeping the inside of the thimble guide tube 18 in vacuum state. Normally, the C-system 10a is used. If the C-system 10a has any failure, the D-system 10b is used.

The operation of the neutron detection apparatus of the third embodiment configured as described above will be described. First, the case where the neutron flux distribution is not measured will be described. Here, the neutron detector 19 is placed in the storage pipe 16 of the reactor outside 30b of the reactor 30.

The control apparatus 17 performs the following control. First, the gate valve 5 is closed to shut down communication between the thimble guide tube 18 side and the drive apparatus 1 side. Next, by using the vacuum unit 10, the inside of the thimble guide tube 18 is made into vacuum, and this state (the driving state of the vacuum unit 10) is kept. Then, measurement of the neutron flux distribution is waited.

Next, the case where the neutron flux distribution is measured will be described. Here, the neutron detector 19 is placed in the storage pipe 16. The control apparatus 17 performs the following control. First, after the vacuum unit 10 is stopped, by using the supply unit 11 and the B-system 9b of the gas purge unit 9, carbon dioxide gas is adjusted to flow at about 7 to 10 liter/min. Then, the thimble guide tube 18 is purged by carbon dioxide gas so that the neutron detector 19 will not bring air in the drive apparatus 1 into the thimble guide tube 18.

In this purge, in the third embodiment, since the exhaust pipe 20 is not provided unlike the first embodiment, carbon dioxide gas is adjusted so as to shut out air in the drive apparatus 1 by the pressure of carbon dioxide gas so that the air will not flow into the thimble guide tube 18. In addition, carbon dioxide gas is adjusted so as to fill the inside of the thimble guide tube 18. Next, the gate valve 5 is opened to allow communication between the thimble guide tube 18 side and the drive apparatus 1 side. Then, the inside of the thimble guide tube 18 is filled with carbon dioxide gas.

Next, the drive apparatus 1 extracts the neutron detector 19 from the storage pipe 16. Next, the drive apparatus 1 inserts the neutron detector 19 into the thimble guide tube 18. Next, the neutron detector 19 measures the neutron flux distribution. Next, the measurement of the neutron flux distribution is finished. Next, the drive apparatus 1 extracts the neutron detector 19 from the thimble guide tube 18. Next, the drive apparatus 1 inserts the neutron detector 19 into the storage pipe 16.

Next, the supply unit 11 and the gas purge unit 9 are stopped. Along with this, the gate valve 5 is closed and the inside of the thimble guide tube 18 is kept vacuum in the same manner as described above. It is noted that since vacuuming is thus frequently conducted, if the C-system 10a of the vacuum unit 10 should have any failure, the C-system 10a is switched to the D-system 10b to deal with the failure.

The neutron detection apparatus of the third embodiment configured as described above, as well as providing the same effect as in the previously-described embodiments, conducts vacuuming immediately even if air should enter the inside of the thimble guide tube, thus preventing occurrence of solid material of ammonium hydrogen carbonate. Therefore, the neutron detection apparatus of the third embodiment is more reliable than those of the first and second embodiments.

It is noted that, within the scope of the present invention, the above embodiments may be freely combined with each other, or each of the above embodiments may be modified or abbreviated as appropriate.

Various modifications and alterations of this invention will be apparent to those skilled in the art without departing from the scope and spirit of this invention, and it should be understood that this is not limited to the illustrative embodiments set forth herein.

What is claimed is:

1. A neutron detection apparatus configured to detect a neutron flux distribution inside of a pressurized water reactor, the neutron detection apparatus comprising:
    a neutron detector configured to detect the neutron flux distribution inside of the reactor;
    a thimble guide tube configured to be inserted into the reactor from the outside of the reactor, for inserting the neutron detector inside of the reactor;
    a drive apparatus which is connected to the thimble guide tube and which inserts the neutron detector into the thimble guide tube or extracts the neutron detector out of the thimble guide tube;
    a vacuum unit which controls a vacuum state in the thimble guide tube;
    a supply unit which supplies carbon dioxide gas;
    a gas purge unit which is connected to the supply unit and conducts gas purge in the thimble guide tube via the flow of carbon dioxide gas into the thimble guide tube;
    a gate valve which is provided between the thimble guide tube and the drive apparatus and opens or closes to allow or prevent communication between the thimble guide tube and the drive apparatus; and
    a control apparatus which controls the gate valve, the drive apparatus, the vacuum unit, the supply unit, and the gas purge unit, so that when the gate valve is closed, first flow of carbon dioxide gas flows inside the thimble guide tube, and when the gate valve is opened, a second flow of carbon dioxide gas, smaller than the first flow, flows inside the thimble guide tube.

2. The neutron detection apparatus according to claim 1, wherein
    the control apparatus is configured to close the gate valve and control the vacuum unit to make the inside of the thimble guide tube have a vacuum atmosphere.

3. The neutron detection apparatus according to claim 2, wherein
    the control apparatus is configured to, after controlling the vacuum unit to make the inside of the thimble guide tube have a vacuum atmosphere, adjust carbon dioxide gas flowing from the gas purge unit to perform gas purge in the thimble guide tube.

4. The neutron detection apparatus according to claim 3, further comprising an exhaust pipe configured to discharge gas from the inside of the drive apparatus, wherein
    the control apparatus is configured to, after the gas purge in the thimble guide tube, open the gate valve, and adjust carbon dioxide gas flowing from the gas purge unit to perform gas purge in the thimble guide tube and in the drive apparatus, and
    the exhaust pipe discharges carbon dioxide gas to outside of the drive apparatus.

5. The neutron detection apparatus according to claim 2, wherein
    the control apparatus is configured to open the gate valve and insert the neutron detector into the thimble guide tube via the drive apparatus.

6. The neutron detection apparatus according to claim 2, wherein
    the control apparatus is configured to open the gate valve and insert the neutron detector into the thimble guide tube via the drive apparatus.

7. The neutron detection apparatus according to claim 4, wherein
    the control apparatus is configured to, after the gas purge in the thimble guide tube and in the drive apparatus, insert the neutron detector into the thimble guide tube via the drive apparatus.

8. The neutron detection apparatus according to claim 1, wherein the position of the gate valve is configured to be higher than a top portion of the reactor.

* * * * *